United States Patent
Hakala et al.

[11] Patent Number: 5,811,906
[45] Date of Patent: Sep. 22, 1998

[54] DAMPER WINDING OF AN ELEVATOR MOTOR

[75] Inventors: Harri Hakala, Hyvinkää; Esko Aulanko, Kerava; Jorma Mustalahti, Hyvinkää, all of Finland

[73] Assignee: Kone Oy, Helsinki, Finland

[21] Appl. No.: 615,088

[22] Filed: Mar. 14, 1996

[30] Foreign Application Priority Data

Mar. 24, 1995 [FI] Finland .................................. 951429

[51] Int. Cl.⁶ .................................................. H02K 00/00
[52] U.S. Cl. ........................ 310/183; 310/182; 310/268; 310/156
[58] Field of Search ................................. 310/182, 183, 310/268, 156, 218

[56] References Cited

U.S. PATENT DOCUMENTS

| | | | |
|---|---|---|---|
| 2,872,604 | 2/1959 | Speth | 310/268 |
| 3,023,330 | 2/1962 | Roters | 310/268 |
| 3,235,760 | 2/1966 | Kober | 310/268 |
| 3,334,254 | 8/1967 | Kober | 310/268 |
| 3,573,517 | 4/1971 | Osterstrom | 310/268 |
| 4,007,387 | 2/1977 | Rustecki | 310/268 |
| 5,216,339 | 6/1993 | Skybyk . | |
| 5,229,766 | 7/1993 | Dade et al. | 310/268 |
| 5,463,263 | 10/1995 | Flynn | 310/156 |

FOREIGN PATENT DOCUMENTS

| | | |
|---|---|---|
| 0162927 | 12/1985 | European Pat. Off. . |
| 0228873 | 7/1987 | European Pat. Off. . |
| 0353042 | 1/1990 | European Pat. Off. . |
| 0620634 | 10/1994 | European Pat. Off. . |
| 6603196 | 9/1966 | Netherlands .......... 310/268 |
| 1644302 | 4/1991 | U.S.S.R. ................ 310/182 |

*Primary Examiner*—Thomas M. Dougherty
*Assistant Examiner*—B. Mullins

[57] ABSTRACT

Damper winding (13) for an elevator motor provided with permanent magnets (14). The damper winding consists of frames (16) surrounding each permanent magnet (14). Each one of the frames is electrically connected to the adjacent frame (16) or the frames are integrated together. The damper winding (13) can be used as a jig for positioning the magnets when these are being fixed to the rotor disc (6). In one of the embodiments, the magnets and damper winding are fixed to the rotor disc by a form-fit interlocking arrangement.

38 Claims, 3 Drawing Sheets

DAMPER WINDING OF AN ELEVATOR MOTOR

The present invention relates to a damping winding for an elevator motor.

Damper windings are typically shorted windings which are used in electric machines for various purposes, such as improving the running characteristics of a motor when affected by transients, improving a motor's starting characteristics and improving e.g. a synchronous motor's ability to withstand a pulsatile load. A further purpose is to reduce the noise level of a motor, which is particularly important in the case of elevator motors.

Damper windings may be placed in the same slots with the motor windings, they may be passed through the magnetic poles or they may be placed in slots on the surface of the magnetic poles.

In a motor provided with permanent magnets, passing the damper winding through the magnet is difficult, and it is likewise difficult to make slots on the surface of the magnet.

The object of the present invention is to propose a new and advantageous solution for the placement of a damper winding in a motor provided with permanent magnets, especially a motor which has a discoidal rotor and a planar air gap oriented in a direction perpendicular to the motor shaft.

The invention provides the advantage that the damper winding is of a simple construction and its manufacturing costs are low. It can be used as a mounting jig when the permanent magnets are being mounted. One of the embodiments of the invention provides a way to secure the permanent magnets on the rotor, in other words, the damping winding can be used to achieve form-fit interlocking of the permanent magnets with the rotor.

DETAILED DESCRIPTION OF THE PREFERRED EMBODIMENTS

Figure 1:
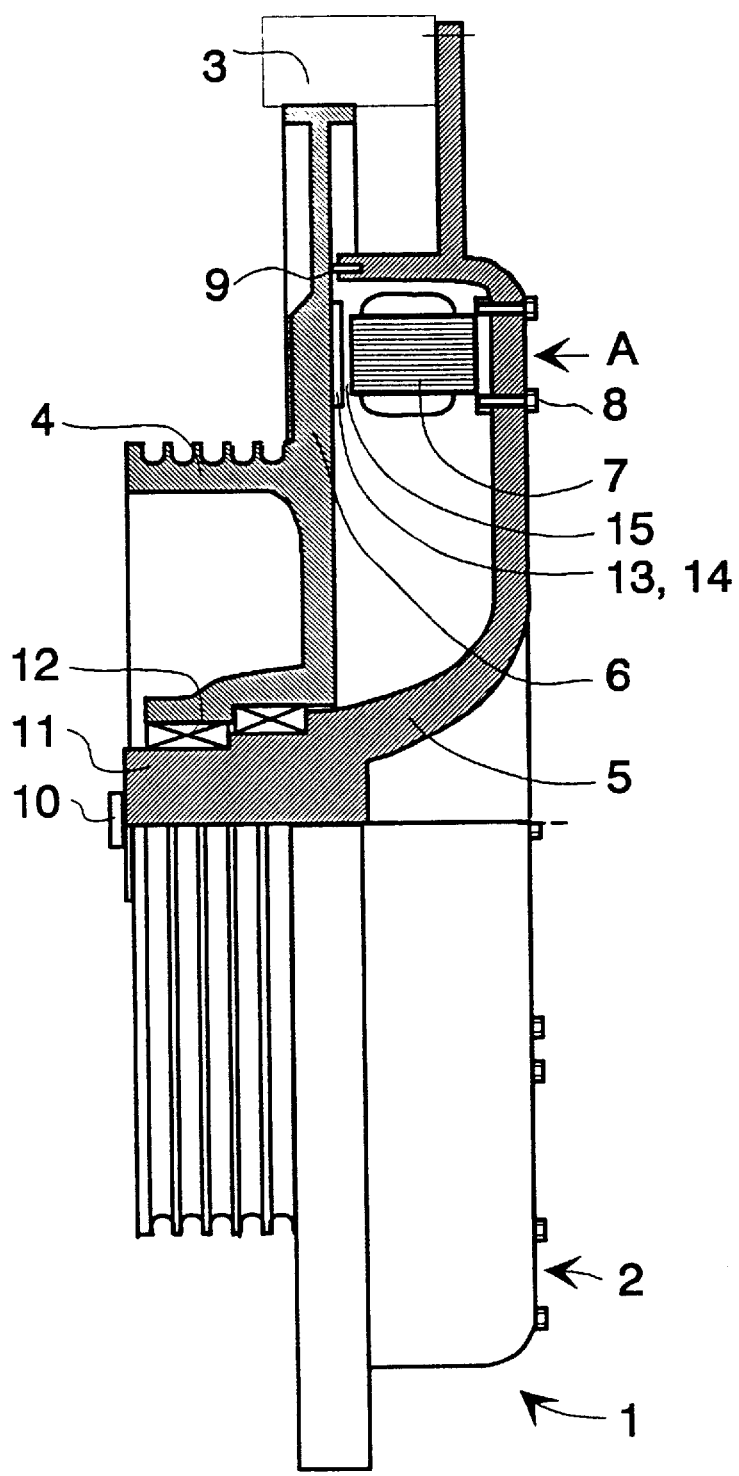
FIG. 1 shows where the damper winding of the invention is located in the cross-section of an elevator motor.

FIG. 1 presents an elevator machinery 1 comprising an elevator motor 2, a brake 3 and a traction sheave 4. The elevator motor 2 comprises a stator 5 and a rotor 6. The stator is a trough-shaped body of revolution with a stator core packet 7 attached to it by means of fixing elements 8. Between the stator and rotor there is a sealing 9. The motor is fixed in place by the stator by means of fixing bolts 10. Bearings 12 are provided between the stator shaft 11 and the rotor 6. The rotor 6 is of a discoidal construction. The traction sheave 4 is attached to the rotor 6. A damping winding 13 as provided by the invention, together with permanent magnets 14, is placed opposite to the stator core packet 7. Between the permanent magnets 14 and the stator core packet 7 is a planar air gap 15, the plane of which is perpendicular to the stator shaft 11.

Figure 2:
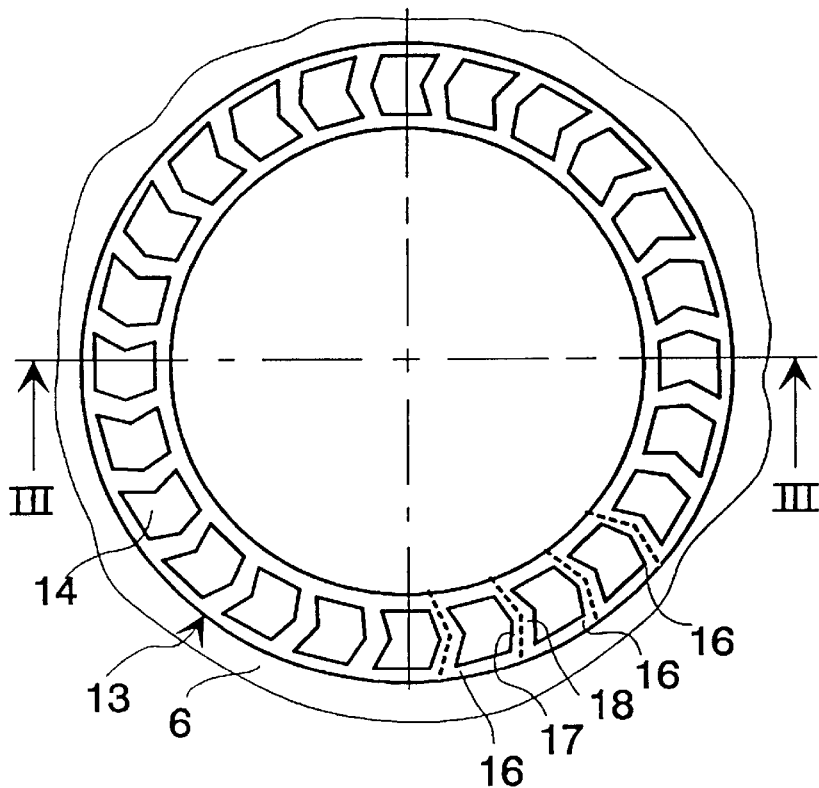
FIG. 2 presents a damper winding in front view.

FIG. 2 presents the damper winding as seen from direction A in FIG. 1. The damper winding 13 consists of frames 16 made of non-magnetic, electrically conductive material, surrounding each permanent magnet 14. The plane of the frames 16 is substantially parallel to the plane of the air gap 15 of the motor 2. Each frame is in electric contact with the adjacent frame so that one side 17 of each frame is connected to one side 18 of the adjacent frame 16 of a permanent magnet. The damping winding can be manufactured by making it from separate frames 16 or by integrating the frames 16 in a single structure to form an integrated circular ring. Separate frames 16 can advantageously be manufactured e.g. from aluminium by extruding.

Figure 3A:
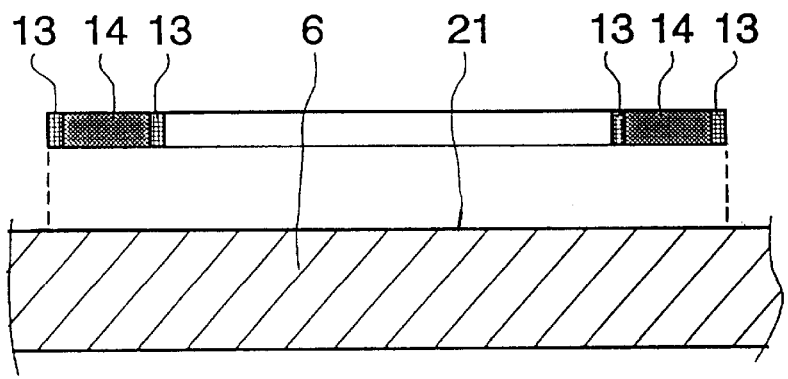
FIG. 3A presents a cross-section of the damper winding before being attached to the rotor.
Figure 3B:
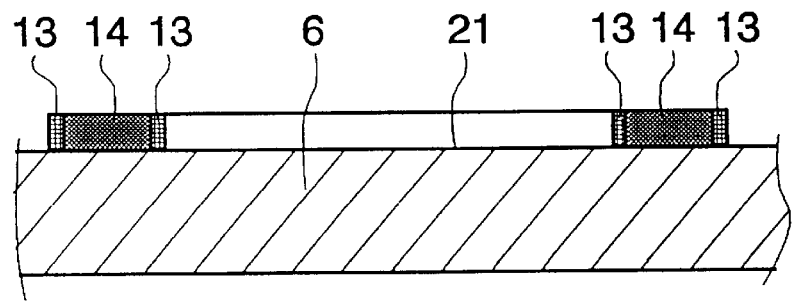
FIG. 3B presents a cross-section of the damper winding attached to the rotor.

FIG. 3B presents section III—III of FIG. 2. The damping winding 13 is fastened onto the rotor 6 and the magnets are placed in the frames 16 and fixed to the surface 21 of the rotor 6 e.g. by gluing. An integrated damping winding is thus excellently applicable as a template or jig for positioning the permanent magnets when the magnets are being mounted on the surface of the rotor disc or in a slot in the rotor disc. The damper coil together with the magnets (FIG. 3A) is attached to the rotor surface by gluing. Of course it is also possible to use e.g. screws to fix the damper winding.

Figure 4:
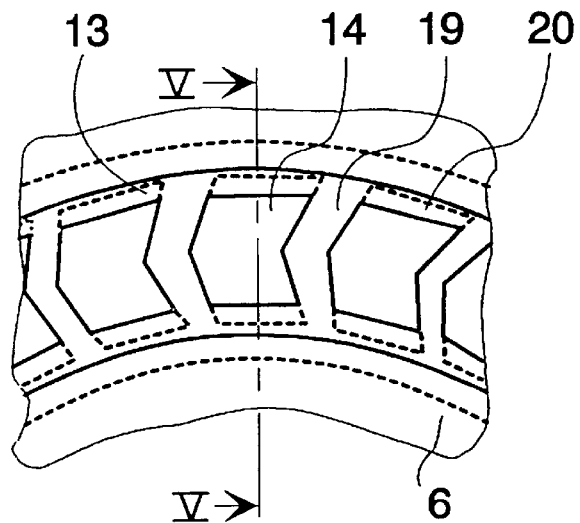
FIG. 4 presents part of a cross-section of a differently shaped damper winding as provided by the invention.

FIG. 4 presents the damper winding 13 as seen from the same direction A as in FIG. 2, but in this case the damper winding is mounted in a slot 19 in the rotor disc.

Figure 5:
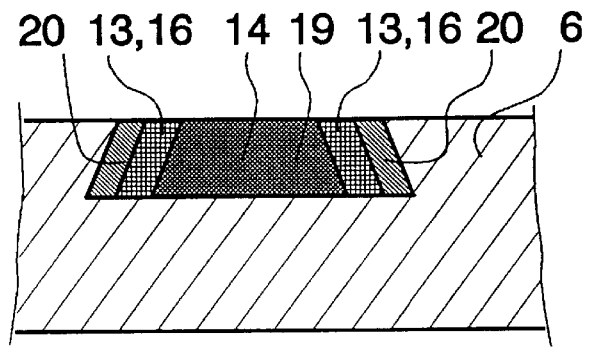
FIG. 5 presents a cross-section of a damper winding of another shape.

FIG. 5 presents a cross-section of FIG. 4 along line V—V. The rotor 6 is provided with a ring-shaped slot 19 of a dovetail-shaped cross-section. The damper winding has slanting outer sides and the side of the damper winding next to the permanent magnet is also at a slant. By using a damper winding of the shape shown in the figure, it is possible to implement form-fit interlocking of the permanent magnet and damper winding in the slot e.g. as follows:

the permanent magnets 14 are placed in the frames of the damper winding 13, in a manner analogous to FIG. 3A, the damper winding is placed in the slot, the slot space that remains between the damper winding 13 and the rotor is filled with form-fit interlocking material 20, such as epoxide resin.

The damper winding can be secured against rotation in the slot by roughening the surfaces of the slot and magnets or by fixing the damper winding to the slot with a screw, spline or the like.

Figure 6:
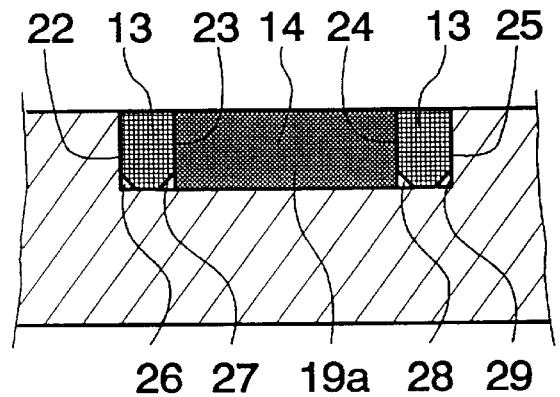
FIG. 6 presents a cross-section of a damper winding of a third shape.

FIG. 6 illustrates another way of fixing the damper winding in a slot 6 on the rotor disc 6. The damper winding 13 together with the permanent magnet 14 is fastened in the slot 19a by working the surfaces 22–25 between the damper winding 13 and the slot 19a and between the damper winding 13 and the permanent magnet 14 to a suitable roughness, preferably a roughness required for close slide fit, and then pressing the damper winding 13 together with the permanent magnets 14 into the slot 19. The corners 26–29 of the damper winding 13 that lie against the bottom of the slot are bevelled or rounded. As the damper winding is made of a rather soft kind of material, such as aluminium, bevelling is needed because pressing the winding into the slot may cause a burr to be raised off the winding. The bevelling prevents the formation of a burr. A bevelling can be made on the magnet as well, or both on the damper winding and the magnet.

It is obvious to a person skilled in the art that the embodiments of the invention are not restricted to the examples described above, but that they may instead be varied in the scope of the following claims.

We claim:

1. A damper winding system of a permanent magnet synchronous motor, comprising:

a stator and a discoidal rotor with a planar air gap between them, the plane of said air gap being substantially perpendicular to a shaft of the motor;

permanent magnets attached to said rotor; and a damper winding having frames made of non-magnetic, electrically conductive material, said frames surrounding said permanent magnets and being arranged in a plane substantially parallel to the plane of the air gap, wherein surfaces between a slot in the rotor disc and the frames of the damper winding have a roughness required for a close slide fit, the frames of the damper winding being frictionally held in the slot by said surfaces.

2. The damper winding system of a permanent magnet synchronous motor as defined in claim 1, wherein said frames are integrated in a single structure.

3. The damper winding system of a permanent magnet synchronous motor as defined in claim 2, wherein the shape of said damper winding is substantially circular.

4. The damper winding system of a permanent magnet synchronous motor as defined in claim 1, wherein the shape of the damper winding is substantially that of a circular ring.

5. The damper winding system of a permanent magnet synchronous motor as defined in claim 1, further comprising a stator core packet mounted on said stator opposite said damper winding.

6. The damper winding system of a permanent magnet synchronous motor as defined in claim 1, wherein said surfaces are perpendicular to the plane of said air gap.

7. The damper winding system of a permanent magnet synchronous motor as defined in claim 1, wherein each permanent magnet is exposed to contact with the rotor and with the air gap.

8. A damper winding system of a permanent magnet synchronous motor, comprising:

a stator and a discoidal rotor with a planar air gap between them, the plane of said air gap being substantially perpendicular to a shaft of the motor;

permanent magnets attached to said rotor; and a damper winding having frames made of non-magnetic, electrically conductive material, said frames surrounding said permanent magnets and being arranged in a plane substantially parallel to the plane of the air gap, wherein the damper winding supports said permanent magnets independently of said rotor.

9. The damper winding system of a permanent magnet synchronous motor as defined in claim 8, wherein each permanent magnet is exposed to contact with the rotor and with the air gap.

10. The damper winding system of a motor as defined in claim 8, wherein each frame has surfaces perpendicular to the air gap, said surfaces directly contacting surfaces of one of said permanent magnets.

11. A damper winding system of a permanent magnet synchronous motor, comprising:

a stator and a discoidal rotor with a planar air gap between them, the plane of said air gap being substantially perpendicular to a shaft of the motor;

permanent magnets attached to said rotor; and a damper winding having frames made of non-magnetic, electrically conductive material, said frames surrounding said permanent magnets and being arranged in a plane substantially parallel to the plane of the air gap, wherein each frame is a separate piece, and each frame is in electrical contact with an adjacent one of said frames, and wherein each piece of the damper winding supports a respective one of said permanent magnets independently of said rotor disc.

12. The damper winding system of a permanent magnet synchronous motor as defined in claim 11, wherein the pieces of the damper winding together with the permanent magnets are fixed in a slot in the rotor disc.

13. The damper winding system of a permanent magnet synchronous motor as defined in claim 12, wherein a gap between the damper winding and a wall of the slot is filled with a form-fit interlocking material.

14. The damper winding system of a permanent magnet synchronous motor as defined in claim 12, wherein the corners of the damper winding that lie against the bottom of the slot are bevelled or rounded.

15. A damper winding system of a permanent magnet synchronous motor, comprising:

a stator and a discoidal rotor with a planar air gap between them, the plane of said air gap being substantially perpendicular to a shaft of the motor;

permanent magnets attached to said rotor; and a damper winding having frames made of non-magnetic, electrically conductive material, said frames surrounding said permanent magnets and being arranged in a plane substantially parallel to the plane of the air gap, wherein the rotor has a slotless planar surface adjacent said air gap, and the damper winding together with said permanent magnets is fixed to the slotless planar surface of said rotor disc.

16. A damper winding system of a permanent magnet synchronous motor, comprising:

a stator and a rotor with an air gap between them;

permanent magnets attached to said rotor; and a damper winding having frames made of non-magnetic, electrically conductive material, said frames surrounding said permanent magnets and being arranged substantially parallel to a portion of the air gap immediately adjacent to the respective frames, wherein the damper winding and the permanent magnets are positioned in a slot in the rotor, and further, wherein surfaces between the damper winding and the slot have a roughness required for a close slide fit, the damper winding being frictionally held in the slot by said surfaces.

17. The damper winding system of a permanent magnet synchronous motor as defined in claim 16, wherein the corners of the damper winding that lie against the bottom of the slot are bevelled or rounded.

18. The damper winding system of a permanent magnet synchronous motor as defined in claim 16, wherein the corners of the permanent magnet that lie against the bottom of the slot are bevelled or rounded.

19. The damper winding system of a permanent magnet synchronous motor as defined in claim 16, wherein the damper winding supports said permanent magnets independently of said rotor disc.

20. The damper winding system of a permanent magnet synchronous motor as defined in claim 16, wherein each frame is a separate piece, and each frame is in electrical contact with an adjacent one of said frames.

21. The damper winding system of a permanent magnet synchronous motor as defined in claim 16, wherein said frames are integrated into a single structure.

22. The damper winding system of a permanent magnet synchronous motor as defined in claim 16, wherein the surfaces are perpendicular to the plane of the air gap.

23. The damper winding system of a permanent magnet synchronous motor as defined in claim 16, wherein the rotor is discoidal and the air gap is substantially perpendicular to a shaft of the motor, said frames being arranged in a plane substantially parallel to the plane of the air gap.

24. A damper winding system of a permanent magnet synchronous motor, comprising:

a stator and a rotor with an air gap between them;

permanent magnets attached to said rotor; and the damper winding having frames made of non-magnetic, electrically conductive material, said frames surrounding said permanent magnets and being arranged substantially parallel to a portion of the air gap immediately adjacent to the respective frames, wherein the damper winding and the permanent magnets are positioned in a slot in the rotor disc, and further wherein a cross section of said slot at one of said frames includes a radial dimension which, as considered along a direction perpendicular to the air gap, varies from a larger radial width to a smaller radial width, the larger radial width being deeper in said slot than the smaller radial width.

25. The damper winding system of a permanent magnet synchronous motor as defined in claim 16, wherein additional surfaces between the damper winding and the permanent magnets have a roughness suitable for a close slide fit, the permanent magnets being frictionally held in the damper winding by said additional surfaces.

26. The damper winding system of a permanent magnet synchronous motor as defined in claim 24, wherein the shape of said damper winding is substantially circular.

27. The damper winding system of a permanent magnet synchronous motor as defined in claim 24, wherein the radial width of said one frame is no greater than the smaller radial width.

28. The damper winding system of a permanent magnet synchronous motor as defined in claim 27, further comprising a form-fit interlocking material between said one frame and said slot.

29. The damper winding system of a permanent magnet synchronous motor as defined in claim 24, wherein the damper winding supports said permanent magnets independently of said rotor disc.

30. The damper winding system of a permanent magnet synchronous motor as defined in claim 24, wherein each frame is a separate piece, and each frame is in electrical contact with an adjacent one of said frames.

31. The damper winding system of a permanent magnet synchronous motor as defined in claim 24, wherein said frames are integrated into a single structure.

32. The damper winding system of a motor as defined in claim 24, wherein the rotor is discoidal and the air gap is substantially perpendicular to a shaft of the motor, said frames being arranged in a plane substantially parallel to the plane of the air gap.

33. A damper winding system of a permanent magnet synchronous motor, comprising:

a stator and a rotor with an air gap between them;

permanent magnets attached to said rotor; and a damper winding having frames made of non-magnetic, electrically conductive material, said frames surrounding said permanent magnets and being arranged substantially parallel to a portion of the air gap immediately adjacent to the respective frames, wherein the damper winding and permanent magnets are fixed in a slot in the rotor disc, and further wherein a cross section of one of said frames includes an outer radial dimension which, as considered along a direction perpendicular to the air gap, varies from a larger radial width to a smaller radial width, the larger radial width being deeper in said slot than the smaller radial width.

34. The damper winding system of a permanent magnet synchronous motor as defined in claim 33, wherein surfaces between the damper winding and the permanent magnets are perpendicular to the plane of said air gap and have a roughness suitable for a close slide fit, the permanent magnets being frictionally held in the damper winding by said surfaces.

35. The damper winding system of a permanent magnet synchronous motor as defined in claim 34, wherein said surfaces are perpendicular to the plane of said air gap.

36. The damper winding system of a motor as defined in claim 33, wherein the rotor is discoidal and the air gap is substantially perpendicular to a shaft of the motor, said frames being arranged in a plane substantially parallel to the plane of the air gap.

37. A damper winding system of a synchronous motor, comprising:

a stator and a rotor with an air gap between them;

permanent magnets attached to the rotor; and a damper winding having frames made of non-magnetic, electrically conductive material, wherein said frames surround said permanent magnets such that the permanent magnets are exposed to the rotor and to the air gap, and further wherein said frames support said permanent magnets independently of the rotor, wherein each frame has surfaces perpendicular to the air gap, said surfaces directly contacting one of the permanent magnets, and further wherein all surfaces of contact between a respective frame and a respective permanent magnet are perpendicular to the air gap, the surfaces of contact between a respective frame and a respective permanent magnet having a roughness suitable for a close slide fit, such that the permanent magnets are frictionally held in the damper winding.

38. The damper winding system of a motor as defined in claim 37, wherein the air gap is a planar air gap substantially perpendicular to a shaft of the motor.

* * * * *